(12) United States Patent
Thompson et al.

(10) Patent No.: US 10,724,632 B1
(45) Date of Patent: Jul. 28, 2020

(54) RETURN TO NEUTRAL MECHANISM FOR HYDROSTATIC TRANSMISSION

(71) Applicant: Parker-Hannifin Corporation, Cleveland, OH (US)

(72) Inventors: Randall Thompson, Lancaster, SC (US); Todd Link, Gray, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 23 days.

(21) Appl. No.: 16/166,497

(22) Filed: Oct. 22, 2018

Related U.S. Application Data (60) Provisional application No. 62/590,851, filed on Nov. 27, 2017.

(51) Int. Cl.
| | | |
|---|---|---|
| *F16H 61/439* | (2010.01) | |
| *F04B 1/324* | (2020.01) | |
| *G05G 1/01* | (2008.04) | |
| *G05G 9/047* | (2006.01) | |
| *F16H 59/02* | (2006.01) | |
| *F16H 39/14* | (2006.01) | |

(52) U.S. Cl.
CPC ............ *F16H 61/439* (2013.01); *F04B 1/324* (2013.01); *G05G 1/01* (2013.01); *G05G 9/047* (2013.01); *F16H 39/14* (2013.01); *F16H 2059/0295* (2013.01)

(58) Field of Classification Search
None
See application file for complete search history.

(56) References Cited

U.S. PATENT DOCUMENTS

| | | | |
|---|---|---|---|
| 7,197,873 B1* | 4/2007 | Windhorst | F04B 1/324 60/487 |
| 7,234,385 B2 | 6/2007 | Dong et al. | |
| 8,695,450 B1* | 4/2014 | McCoy | F16H 61/437 74/473.1 |
| 9,141,126 B2* | 9/2015 | Hynes | G05G 1/01 |
| 9,341,258 B1* | 5/2016 | Templin | F16H 59/0278 |
| 2013/0145890 A1 | 6/2013 | Hynes et al. | |

* cited by examiner

*Primary Examiner* — Dirk Wright
(74) *Attorney, Agent, or Firm* — Renner, Otto, Boisselle & Sklar, LLP (57) ABSTRACT

A return-to-neutral mechanism for a hydrostatic transmission configured to return a control member of a pump to neutral after the control member has been moved toward a forward or reverse position. The return-to-neutral mechanism includes a stop member mountable to a housing, a control arm for moving the control member, and a spring for engaging the control arm and stop member to bias and return the control arm to neutral after being released from forward or reverse positions. The stop member may have an opening for receiving a fastener for mounting to the housing, and the opening may be configured to permit adjustment of the stop member along at least two transverse directions to preload the spring at the neutral position. The control arm may have abutments for moving legs of the spring, and the abutments may have recessed and protruding portions for receiving and containing the spring legs.

21 Claims, 7 Drawing Sheets

RETURN TO NEUTRAL MECHANISM FOR HYDROSTATIC TRANSMISSION

RELATED APPLICATIONS

This application claims the benefit of U.S. Provisional Application No. 62/590,851 filed Nov. 27, 2017, which is hereby incorporated herein by reference in its entirety.

TECHNICAL FIELD

The present invention relates generally to transmissions for vehicles, and more particularly to a hydrostatic transmission having a return to neutral mechanism for use in mowing machines, such as zero-turn-radius mowers.

BACKGROUND

Hydrostatic transmissions have many uses, including the propelling of vehicles, such as mowing machines. A typical hydrostatic transmission system includes a variable displacement hydraulic pump connected in a closed hydraulic circuit with a fixed or variable displacement hydraulic motor. The closed hydraulic circuit includes a first conduit connecting the main pump outlet with the motor inlet and a second conduit connecting the motor outlet with a pump inlet. For most applications, the pump is driven by a prime mover, such as an internal combustion engine or an electrical motor, at a certain speed in a certain direction. Changing the displacement of the main pump will change its output flow rate, which controls the speed of the motor. Pump outflow can be reversed, thus reversing the direction of the motor. In a vehicle, the motor is often connected through suitable driving means to the vehicle's wheels or tracks, such as through gearing and/or coupling to an output shaft. In some vehicles, such as zero-turn-radius mowers, separate hydrostatic transmissions are used to independently drive separate wheels of the vehicle.

The hydraulic pump usually is a piston-type pump including a plurality of reciprocating pistons sliding axially within a barrel which are in fluid communication through hydraulic porting with the hydraulic motor. Rotation of the barrel and driving of the pistons against a rotatable swash plate creates an axial motion of the pump pistons that forces hydraulic fluid through the hydraulic porting to the hydraulic motor to drive the motor. The rotated angle of the swash plate with respect to the hydraulic pump pistons can be changed to vary the speed and change the direction of rotation of the hydraulic motor and thus the speed and direction of rotation of the vehicle axle. The orientation with which the swash plate addresses the hydraulic pump pistons can be changed to control whether the hydraulic motor rotates in the forward direction or in the reverse direction. Additionally, the angle at which the swash plate addresses the hydraulic pump pistons can be changed to increase or decrease the amount of hydraulic fluid that is forced from the hydraulic pump to the hydraulic motor to change the speed at which the hydraulic motor rotates.

The position of the rotatable swash plate typically is varied by rotating a trunnion arm that is coupled to the swash plate. The trunnion arm projects from the pump housing for coupling to a speed change lever or a speed change pedal of the vehicle through a cable, lever or other linkage. In this manner, movement of the speed change lever/pedal results in rotational movement of the trunnion arm to change the position of the swash plate to thereby control the speed and direction of the vehicle.

Return to neutral mechanisms typically have been used to cause the swash plate of the pump to assume a neutral position after having been shifted to a forward or reverse position. These return to neutral mechanisms are typically made of multiple parts and may be difficult to assemble, or are required to be integrated into the vehicle linkage, and thus generally do not permit sufficient adjustment of the return to neutral mechanism during assembly to adequately set the neutral position, while also minimizing lag in movements between the mechanism components when they are moved toward forward or reverse positions.

SUMMARY

The present disclosure provides a hydraulic drive apparatus having a return to neutral mechanism configured to return a control member of a pump to a neutral position after the control member has been moved toward a forward or reverse position.

More particularly, the return to neutral mechanism may utilize a biasing member, such as a spring, to bias and automatically return the control member to its neutral position, in which the mechanism may have one or more features that allow adequate adjustment of the assembly to preload the spring in such a way that reduces lag between mechanism components, which may enhance the feel and operation of the return to neutral mechanism when in use, and may securely hold the control member in the neutral position.

For example, the return to neutral mechanism may include a stop member mountable to a housing, a control arm for moving the control member of the pump from a neutral position to forward or reverse positions, and a spring configured to engage the control arm and stop member to bias the control arm, and thereby the control member, back to the neutral position. The spring may have spring legs configured to engage respective abutments of the control arm and respective spring stops of the stop member. The control arm may be rotated about a pivot axis to urge the spring legs toward each other against the biasing force of the spring, and the spring may bias and automatically return the control arm to the neutral position after being released from the forward or reverse positions. The stop member may have at least one opening for receiving a fastener to fixedly mount the stop member to the housing, and the at least one opening may be configured to permit adjustment of the stop member along at least two directions transverse to the pivot axis to preload the spring via the spring legs at the neutral position prior to the stop member being fixedly mounted to the housing.

By providing such multi-directional adjustment capabilities, the stop member may preload the spring in such a way that each spring leg is always interfacing with either a spring stop of the stop member, an abutment of the control arm, or both the spring stop and the abutment. Such adjustment capabilities to preload the spring in this way may therefore reduce operational lag during rotation of the control arm because each spring leg always may be engaged and permitted to move relative to the other spring leg when the control arm is rotated from the neutral position toward the forward or reverse positions.

Such multi-directional adjustment capabilities of the stop member also may provide for more flexibility in component manufacturing tolerances. This may allow certain components, such as the control arm and/or stop member, to be made from powder metallurgy techniques, which may provide a cost advantage compared to fabricated and machined parts.

The return to neutral mechanism also may include one or more features that control movement of the spring, while restricting shifting and/or twisting, and also while encompassing the spring to prevent disengagement. For example, the control arm may have a first abutment for engaging and urging a first spring leg, and a second abutment for engaging and urging a second spring leg. More particularly, the first abutment may have a first recessed portion for receiving the first spring leg, and the second abutment may have a second recessed portion for receiving the second spring leg, which may help to restrict axial movement of the spring legs and/or prevent the legs from disengaging from the abutments. The recessed portions and/or protruding portions of the respective abutments may be axially offset to accommodate for an axial offset of the respective spring legs. The spring legs also may each have a bent section configured to at least partially wrap around the corresponding abutments and/or interlockingly engage within the recessed portions, such as for restricting upward movement of the spring. A cylindrical support may be provided to extend through a coil portion of the spring to restrict vertical or twisting movement of the spring. In addition, one or more axially extending tabs also may be provided on the control arm to further restrict vertical movement of the spring.

According to one aspect of the present disclosure, a hydrostatic transmission is provided, including: a hydraulic motor having an output shaft for driving at least one wheel of the vehicle; a hydraulic pump in fluid communication with the hydraulic motor, the hydraulic pump having a movable control member for controlling the output of the pump; a housing containing at least the hydraulic pump; a rotatable shaft operatively coupled to the movable control member and having at least a portion extending from the housing; and a return to neutral mechanism operatively coupled to the rotatable shaft, the return to neutral mechanism comprising: a stop member mounted to the housing; a control arm operatively coupled to the portion of the rotatable shaft extending from the housing, the control arm being rotatable about a pivot axis between a first position, in which the control arm moves the rotatable shaft and thereby the control member toward a forward position for effecting pump output flow that enables the vehicle to propel forward, and a second position, in which the control arm moves the rotatable shaft and thereby the control member toward a reverse position for effecting pump output flow that enables the vehicle to propel in reverse; and a spring for engaging the control arm and the stop member, the spring configured to bias the control arm to a neutral position, between the first position and the second position, in which the control arm moves the rotatable shaft and thereby the control member to a position in which the vehicle is in neutral; wherein the stop member has at least one opening for receiving a fastener to fixedly mount the stop member to the housing, the at least one opening configured to permit adjustment of the stop member along at least two directions transverse to the direction of the pivot axis, to preload the spring with the stop member at the neutral position prior to the stop member being fixedly mounted to the housing, such that the return to neutral mechanism is configured to automatically return the control arm to the neutral position after the control arm has been moved toward the first or second positions.

According to another aspect of the present disclosure, a hydrostatic transmission is provided, including: a hydraulic motor having an output shaft for driving at least one wheel of the vehicle; a hydraulic pump in fluid communication with the hydraulic motor, the hydraulic pump having a movable control member for controlling the output of the pump; a housing containing at least the hydraulic pump; a rotatable shaft operatively coupled to the movable control member and having at least a portion extending from the housing; and a return to neutral mechanism operatively coupled to the rotatable shaft, the return to neutral mechanism comprising: a stop member mounted to the housing; a control arm operatively coupled to the portion of the rotatable shaft extending from the housing, the control arm being rotatable about a pivot axis between a first position, in which the control arm moves the rotatable shaft and thereby the control member toward a forward position for effecting pump output flow that enables the vehicle to propel forward, and a second position, in which the control arm moves the rotatable shaft and thereby the control member toward a reverse position for effecting pump output flow that enables the vehicle to propel in reverse; and a spring for engaging the control arm and the stop member, the spring having a first spring leg and a second spring leg and being configured to bias the control arm to a neutral position, between the first position and the second position, in which the control arm moves the rotatable shaft and thereby the control member to a position in which the vehicle is in neutral; wherein the control arm has a first abutment having a first recessed portion for receiving the first spring leg, the first abutment being configured to engage and urge the first spring leg toward the second spring leg against the biasing force of the spring when the control arm is rotated toward the first position; and wherein the control arm has a second abutment having a second recessed portion for receiving the second spring leg, the second abutment being configured to engage and urge the second spring leg toward the first spring leg against the biasing force of the spring when the control arm is rotated toward the second position.

According to another aspect of the present disclosure, a return to neutral mechanism is provided for a hydrostatic transmission that includes a housing containing a pump and a rotatable shaft extending outside of the housing for controlling the output of the pump, the return to neutral mechanism including: a stop member mountable to the housing; a control arm operatively couplable to the rotatable shaft extending outside of the housing, the control arm being rotatable about a pivot axis between a first position and a second position to move the rotatable shaft between forward and reverse positions, respectively; and a spring for engaging the control arm and the stop member, the spring being configured to bias the control arm to a neutral position, between the first position and the second position, to move the rotatable shaft to a neutral position; wherein the stop member has at least one opening for receiving a fastener to fixedly mount the stop member to the housing, the at least one opening being sized relative to the portion of the fastener extending through the opening to provide sufficient spacing that allows adjustment of the stop member along at least two directions transverse to the direction of the pivot axis.

According to another aspect of the present disclosure, a return to neutral mechanism is provided for a hydrostatic transmission that includes a housing containing a pump and a rotatable shaft extending outside of the housing for controlling the output of the pump, the return to neutral mechanism including: a stop member mountable to the housing; a control arm operatively couplable to the rotatable shaft extending outside of the housing, the control arm being rotatable about a pivot axis between a first position and a second position to move the rotatable shaft between forward and reverse positions, respectively; and a spring for engaging the control arm and the stop member, the spring being configured to bias the control arm to a neutral position, between the first position and the second position, to move the rotatable shaft to a neutral position; wherein the control arm has a first abutment having a first recessed portion for receiving the first spring leg, the first abutment being configured to engage and urge the first spring leg toward the second spring leg against the biasing force of the spring when the control arm is rotated toward the first position; and wherein the control arm has a second abutment having a second recessed portion for receiving the second spring leg, the second abutment being configured to engage and urge the second spring leg toward the first spring leg against the biasing force of the spring when the control arm is rotated toward the second position.

According to another aspect of the present disclosure, a return to neutral mechanism is provided for a hydraulic drive apparatus including a housing having a hydraulic pump mounted therein and a trunnion arm extending outside the housing and being rotatable for controlling the output of the pump, the return to neutral mechanism including: a stop member mountable to the housing and having a first stop abutment and a second stop abutment; a control arm connectable to the trunnion arm and movable between forward and reverse positions to move the trunnion arm between forward and reverse positions, respectively; and a torsion spring operatively coupled to the stop member and the control arm for biasing and returning the control arm to a neutral position after the control arm has been moved to at least one of the forward or reverse positions; wherein the first and second stop abutments of the return member each engage the torsion spring at a point radially inward from a point where the control arm engages the torsion spring, with respect to the trunnion arm.

The following description and the annexed drawings set forth certain illustrative embodiments according to the present disclosure. These embodiments are indicative, however, of but a few of the various ways in which the principles of the disclosure may be employed. Other objects, advantages and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects according to the present disclosure.

DETAILED DESCRIPTION

The principles of the present disclosure have particular application to hydrostatic transmissions for mowers, such as zero-turn-radius mowers, and thus will be described below chiefly in this context. It is understood, however, that the principles and aspects according to the present disclosure may be applicable to other hydraulic drive apparatus, such as hydraulic pumps and/or hydraulic motors, or may be applicable to other vehicles, such as vehicles utilizing mechanical, hydrostatic, hydraulic, or electric drive systems, as desired.

Figure 1:
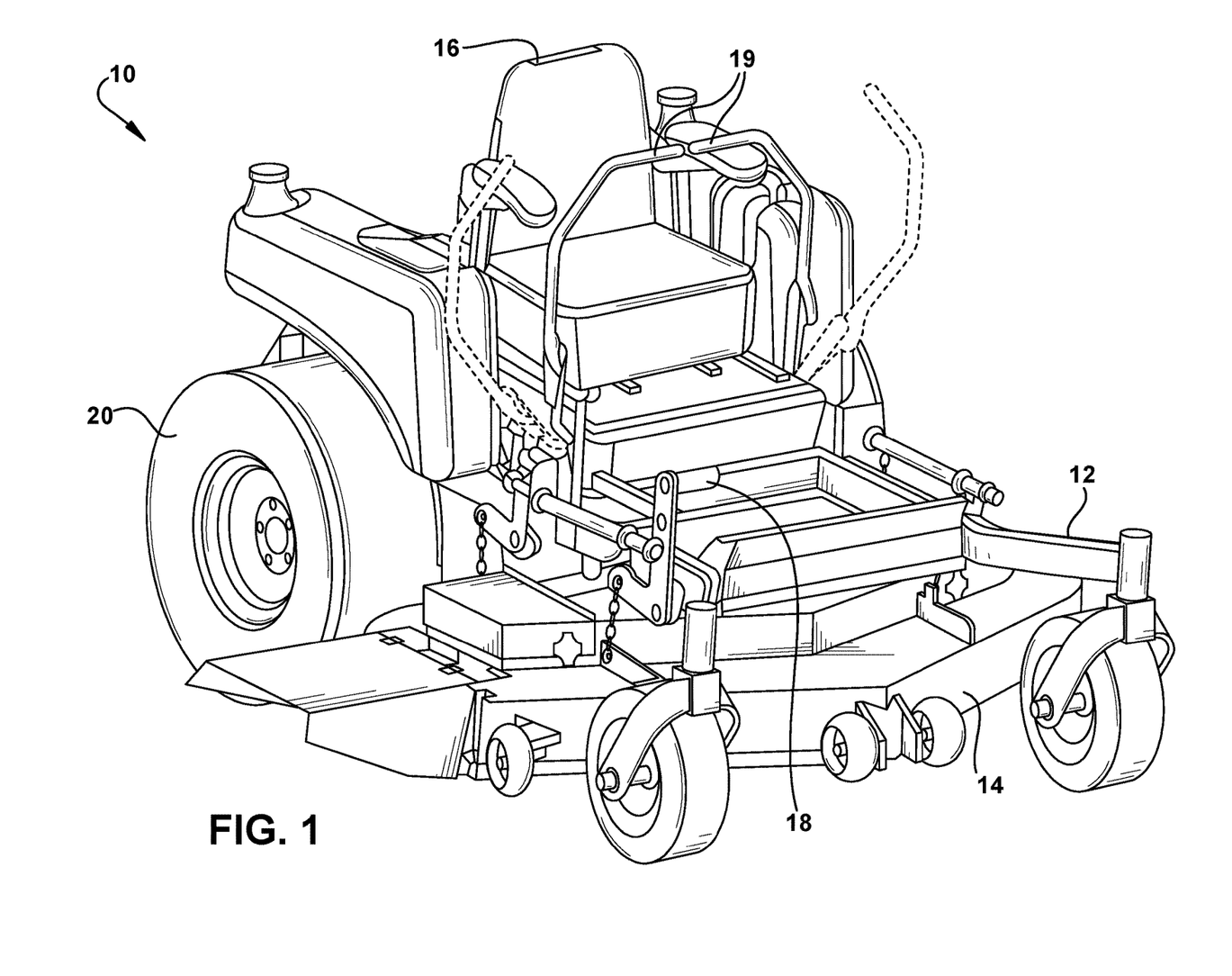
FIG. 1 is a perspective view of an exemplary zero-turn-radius mower.

Referring to FIG. 1, an exemplary zero-turn-radius mower 10 is shown. The mower 10 may include a frame 12, a mower deck 14 supported by the frame 12, an operator seat 16, and a plurality of controls 18 for operating the mower 10. A rear mounted engine (not shown) may be mounted to the frame 12 behind the seat 16 to provide power to a hydraulic axle combination mounted to the frame 12. The hydraulic axle combination includes hydrostatic transmissions, such as a left-hand hydrostatic transmission 22 (shown in FIG. 2, for example) and a right-hand hydrostatic transmission (not shown), which are essentially mirror images of each other. The hydrostatic transmissions can be controlled by an operator, such as via handles 19, to independently drive respective rear wheels 20 to propel the mower 10 forward or reverse, and to provide zero-turn-radius functionality. The design of the illustrated mower 10 is merely exemplary in nature, and it will be appreciated that other mower designs and vehicle types can be used in accordance with the present disclosure.

Figure 2:
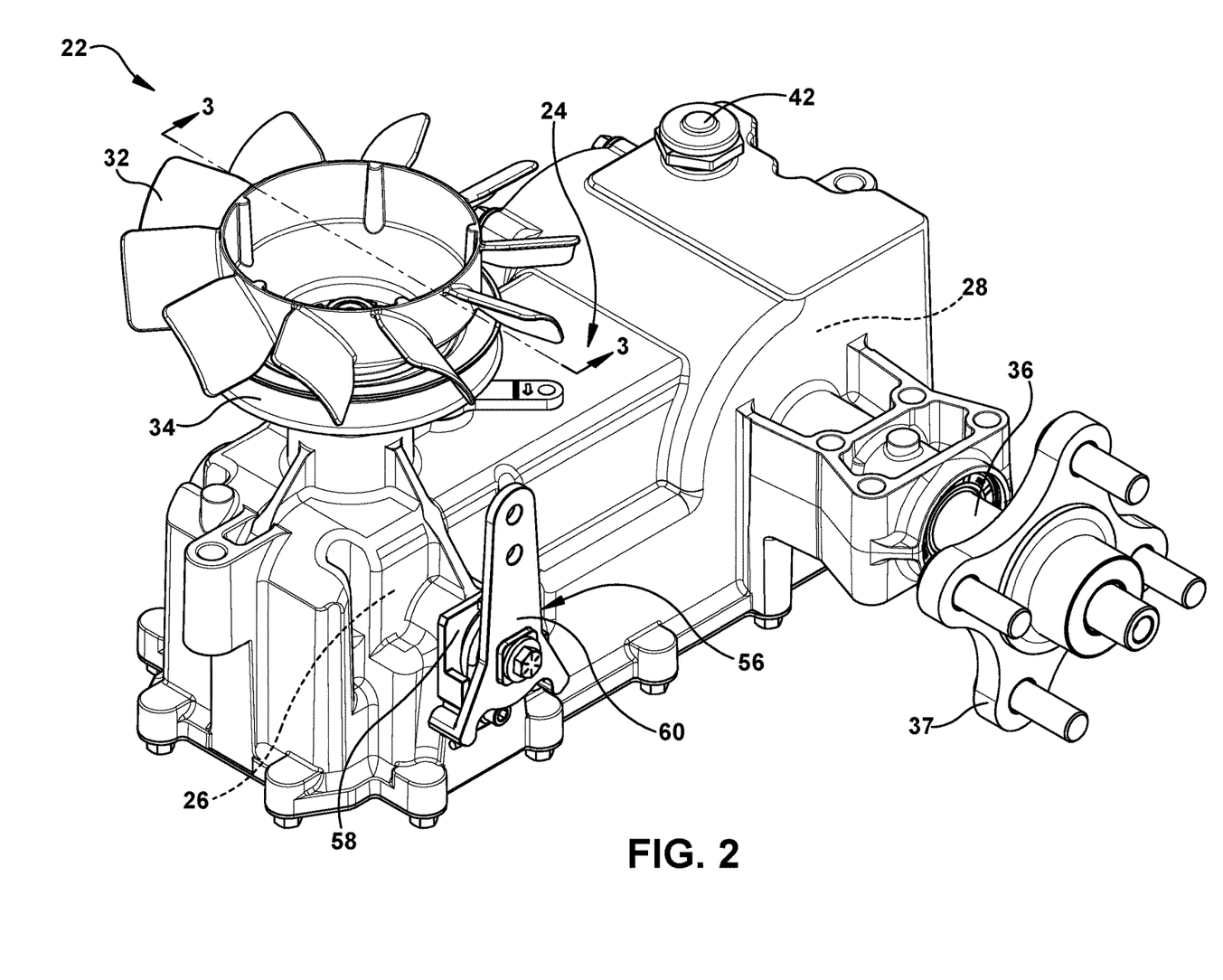
FIG. 2 is a perspective view of an exemplary hydrostatic transmission including an exemplary return to neutral mechanism according to an embodiment of the present disclosure.
Figure 3:
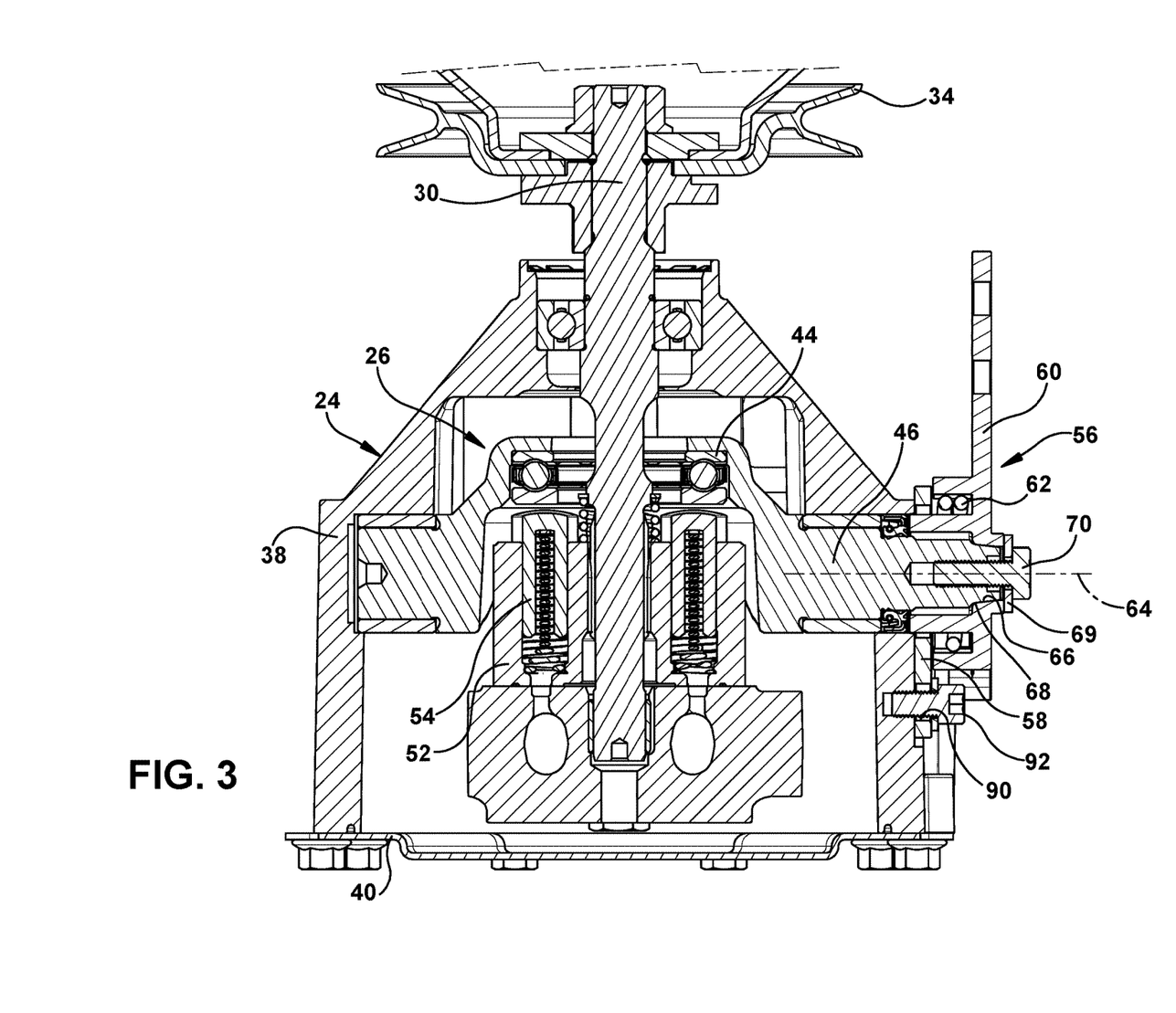
FIG. 3 is a cross-sectional side view of the hydrostatic transmission and return to neutral mechanism in FIG. 2 taken about the line 3-3, in which the return to neutral mechanism is shown in an exemplary neutral position.
Figure 4:
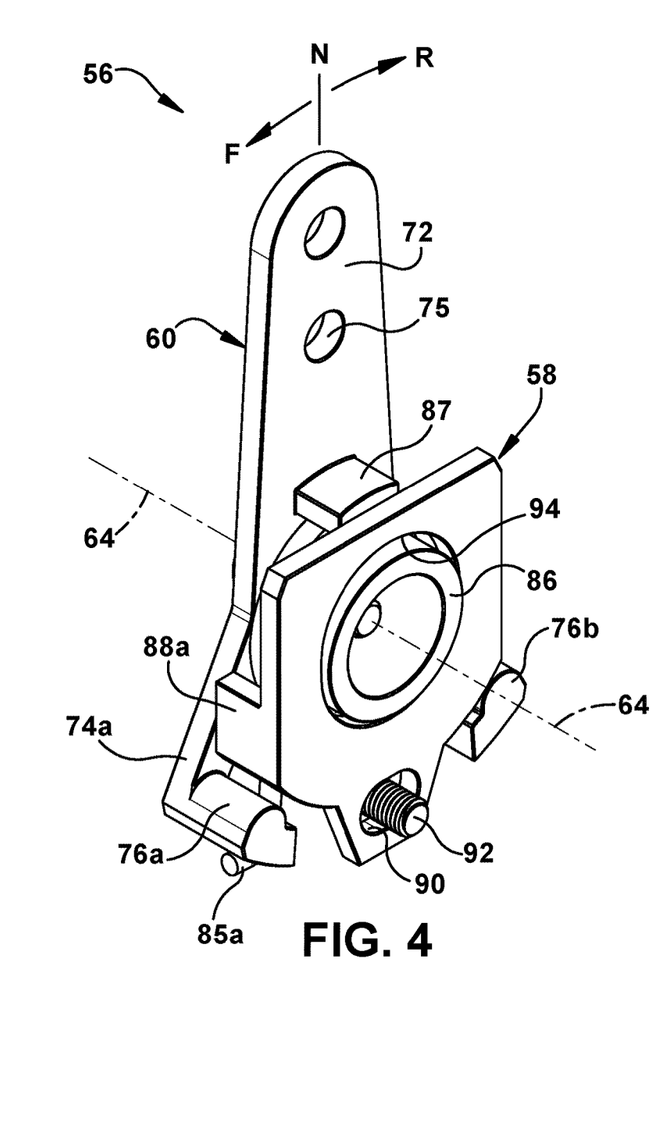
FIG. 4 is a perspective rear view of the return to neutral mechanism in FIG. 2.
Figure 5:
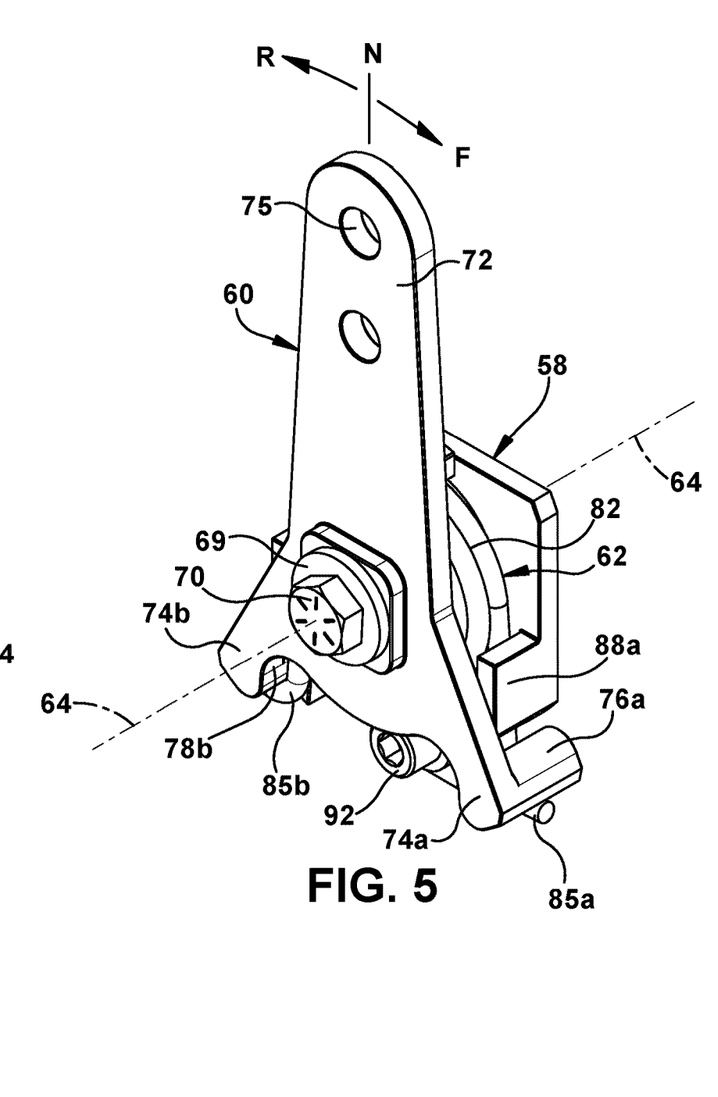
FIG. 5 is a perspective front view of the return to neutral mechanism in FIG. 2.
Figure 6:
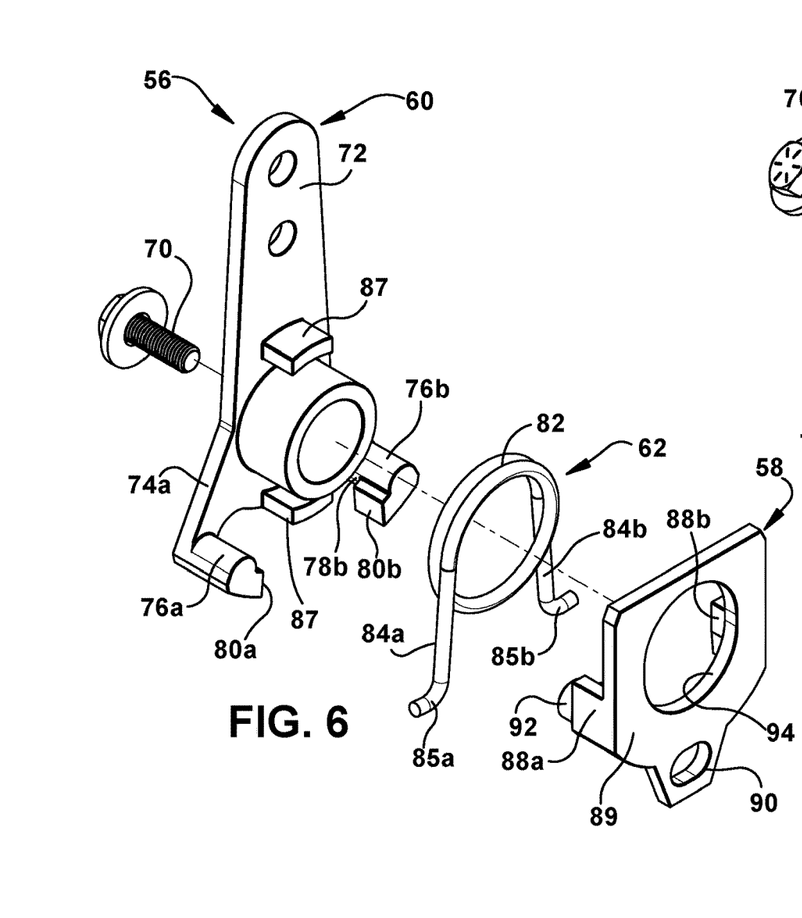
FIG. 6 is an exploded perspective rear view of the return to neutral mechanism in FIG. 2.
Figure 7:
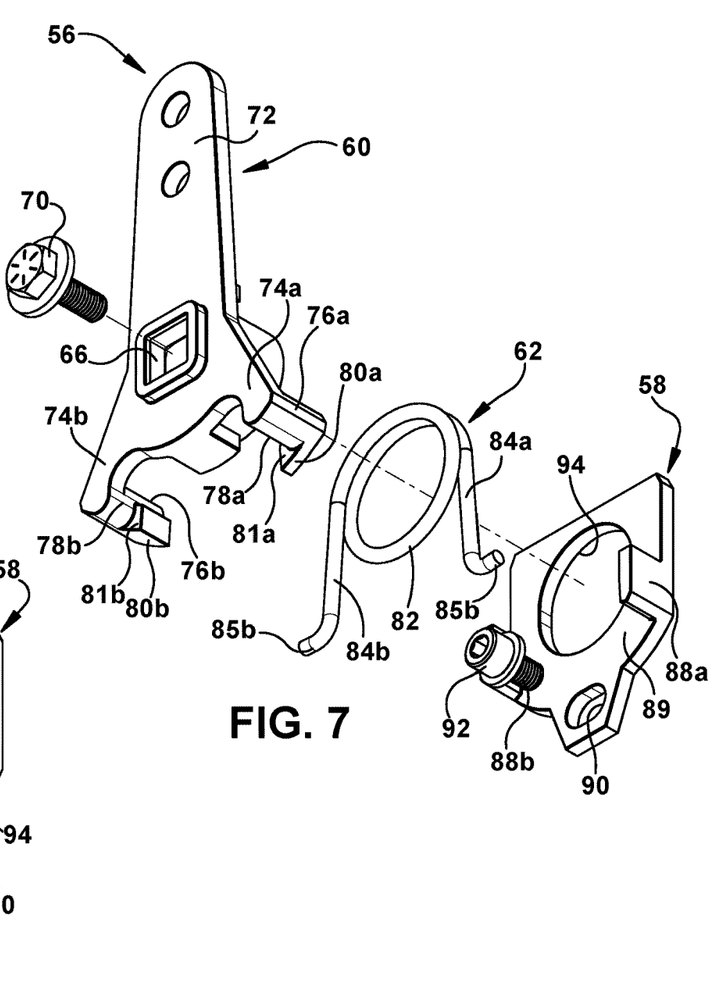
FIG. 7 is an exploded perspective front view of the return to neutral mechanism in FIG. 2.
Figure 8:
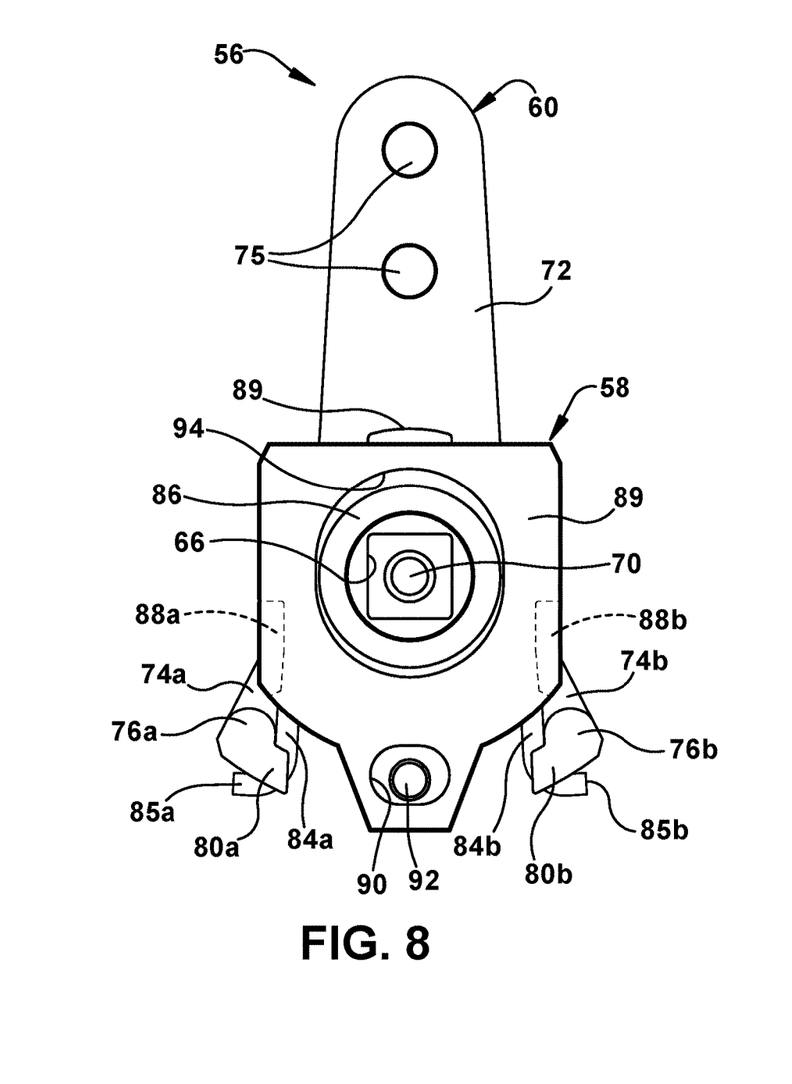
FIG. 8 is a rear plan view of the return to neutral mechanism in FIG. 2.

Referring to FIGS. 2 and 3, the exemplary hydrostatic transmission 22 is shown in further detail. In the illustrated embodiment, the hydrostatic transmission includes a housing 24 containing a reversible hydraulic pump 26 fluidly connected to a hydraulic motor 28 in a closed loop hydraulic circuit, such as via suitable porting, conduits or fluid passages. An input shaft 30 (shown in FIG. 3) for driving the pump 26 extends vertically from a top of the housing 24 and may include a fan 32 and a pulley 34. The pulley 34 may be connected by a belt to a prime mover, such as an internal combustion engine (not shown) of the vehicle 10, for turning the input shaft 30. Alternatively, other types of drive wheels may be employed, such as a sprocket for use with a chain drive. The hydraulic motor 28 may include an output shaft 36 that may act as an axle shaft or be coupled to an axle shaft. The output shaft 36 may extend along a horizontal axis from the housing 24 and may be operatively coupled to a wheel hub 37, such as with a suitable coupling, for mounting the wheel 20.

As shown in the illustrated embodiment, a housing cover 38 and a base plate 40 together form a sealed interior space of the housing 24 that contains the motor 28 and pump 26. The hydraulic pump 26 may be any suitable pump, such as a variable displacement piston pump. The hydraulic motor 28 may be any suitable motor, such as a low speed, high torque hydraulic motor. In the illustrated embodiment, the motor 28 is integral with the pump 24, and may be mounted to the frame of the vehicle 10 using any suitable fastener, such as bolts or the like. The interior of the housing 24 of the integral pump/motor assembly may serve as a shared sump for the motor 28 and pump 26, and further may function as a reservoir. The reservoir housing 24 may contain hydraulic fluid, such as oil, for operation of the hydraulic pump 26 and motor 28, and may have a fill port 42 for filling the housing 24 with the hydraulic fluid.

The hydraulic pump 26 and hydraulic motor 28 may operate in a well-known manner as understood by those having ordinary skill in the art. Generally, the input shaft 30 drives the pump 26, which in turn supplies pressurized hydraulic fluid for driving the motor 28. When the pump 26 supplies the pressurized hydraulic fluid to an inlet of the motor 28, the motor drives the output shaft 36 and thereby the wheel 20. The hydraulic pump 26 includes a movable control member 44 that allows for controlling the output of the pump 26, which in turn can adjust the speed and or direction of the motor 28 and thereby the wheel 20. For example, the control member 44 may be operatively coupled to a rotatable shaft 46, and the rotatable shaft 46 may be rotated in a first direction to move the control member 44 toward a forward position for effecting pump output flow that enables the vehicle 10 to propel forward. The rotatable shaft 46 also may be rotated in a second direction opposite the first direction to move the control member 44 toward a reverse position for effecting pump output flow that enables the vehicle 10 to propel in reverse. The rotatable shaft 46 also may move the control member 44 to a neutral position between the forward and reverse directions in which the vehicle 10 is in neutral.

In the illustrated embodiment, the pump 26 is a variable flow reversible piston pump, which operates in a manner well-known to those having ordinary skill in the art. The pump 26 includes a cylinder barrel 50 having a plurality of pistons 52 mounted for reciprocal movement therein, and the cylinder barrel 50 is coupled to the input shaft 26 for rotation therewith. In the illustrated embodiment, the control member 44 is a swash block 44 (also referred to as a swash plate) arranged such that the pistons 54 abut its lower surface. The swash block 44 can be inclined in a first direction (e.g., forward) and a second direction (e.g., reverse) from a neutral position (e.g., zero-inclination). Inclining the swash block 44 in the first direction (e.g., a forward position) results in the pump 26 supplying pressurized fluid in a first direction to the motor 28 to propel the vehicle forward, while inclining the swash block 44 in the opposite direction (e.g., a reverse position) results in the pump 26 supplying pressurized fluid in the opposite direction to the motor 28 to propel the vehicle in reverse. In the illustrated embodiment, the rotatable shaft 46 is a trunnion arm, which may be operatively coupled to the swash block 44 via any suitable linkages, such that inclination of the swash block 44 may be controlled by rotation of the trunnion arm, thereby controlling the output of the pump 26 and the direction and/or speed of the motor 28.

As shown in the illustrated embodiment, the hydrostatic transmission 22 also includes an exemplary return to neutral mechanism 56 that enables rotation of the shaft 46 for moving the control member 44 between its forward and reverse positions, thereby effecting pump output flow for propelling the vehicle forward or reverse, as discussed above. As discussed in further detail below, the return to neutral mechanism 56 also functions to bias and automatically return the control member 44 to its neutral position after the shaft 46 and control member 44 have been moved toward at least one of the forward or reverse positions.

Referring to FIGS. 3-11, the exemplary return to neutral mechanism 56 will be described in further detail. As shown, the return to neutral mechanism 56 generally includes a stop member 58 mounted to the housing 24, a control arm 60 operatively coupled to the rotatable shaft 46 for moving the control member 44 between forward and reverse positions, and a biasing member, such as a spring 62, configured to engage the control arm 60 and the stop member 58 for biasing and automatically returning the shaft 46 and control member 44 to the neutral position.

As shown in the illustrated embodiment, the control arm 60 may be fixedly mounted to the shaft 46 for being co-rotatable therewith about a pivot axis 64. In this manner, the control arm 60 is rotatable about the pivot axis 64 between a first position (designated with directional arrow, F), in which the control arm 60 moves the rotatable shaft 46 and thereby the control member 44 toward a forward position for effecting pump output flow that enables the vehicle to propel forward, and a second position (designated with directional arrow, R), in which the control arm 60 moves the rotatable shaft 46 and thereby the control member 44 toward a reverse position for effecting pump output flow that enables the vehicle to propel in reverse. Between the first position and the second position, the control arm 60 may be in a neutral position (designated by the position N, shown in FIGS. 4 and 5, for example), in which the control arm 60 moves the rotatable shaft 46 and thereby the control member 44 to a position in which the vehicle is in neutral.

In exemplary embodiments, the control arm 60 may be mounted at a central portion to the rotatable shaft 46 and fixed for rotation by a square slot 66 in the control arm 60 that receives and engages a square end portion 68 of the shaft 46 that extends outwardly of the housing 24 (as shown in FIG. 3, for example). In the illustrated embodiment, a fastener, such as a bolt 70 including a washer 69, is provided for securing the control arm 60 to the shaft 46, such as by threading the bolt 70 into the end of the shaft 46. It is understood that although the square slot 66 and square portion 68 typically are of corresponding shape, other suitable non-circular configurations may be used to restrict relative rotation between the control arm 60 and the shaft 46. For example, the control arm 60 and shaft 46 may be keyed together.

As shown in the illustrated embodiment, the control arm may have a generally Y-shaped main body portion, including an elongated upper portion 72 and two laterally spaced apart control arm legs 74a and 74b. The upper portion 72 may be configured to be operatively coupled to a control device (such as handles 19, shown in FIG. 1, for example) for manipulation by the operator to control the movement of the control arm 60. One or more holes 75 may be provided for connection of the control arm 60 to a cable or other suitable linkage that may extend to a speed control lever, pedal, or other suitable control device that can be operated by the vehicle operator.

In exemplary embodiments, the control arm 60 includes a first abutment 76a and a second abutment 76b. The abutments 76a and 76b may extend from the control arm legs 74a and 74b, respectively, in the direction of the pivot axis 64 toward the stop member 58 mounted to the housing 24. Each abutment 76a, 76b may have a recessed portion 78a, 78b and a protruding portion 80a, 80b. In exemplary embodiments, the protruding portion 80a, 80b of each abutment 76a, 76b may extend transverse to the pivot axis direction and may be spaced apart from the control arm leg 74a, 74b to define at least a portion of the first recessed portion 78a, 78b.

As shown in the illustrated embodiment, the spring 62 may be a torsion spring, having a coil portion 82, a first spring leg 84a, and a second spring leg 84b. The coil portion 82 may be disposed about the pivot axis 64 such that the coil is coaxial with the rotation shaft 46. The spring legs 84a and 84b may extend away from the coil portion 82 and may be laterally spaced apart to engage with the corresponding laterally spaced apart abutments 76a and 76b of the control arm 60. In this manner, the first abutment 76a is configured to engage and urge the first spring leg 84a toward the second spring leg 84b against the biasing force of the spring 62 when the control arm is rotated toward the first position; and the second abutment 76b is configured to engage and urge the second spring leg 84b toward the first spring leg 84a against the biasing force of the spring 62 when the control arm is rotated toward the second position. In exemplary embodiments, the spring legs 84a and 84b may be received within and engage the recessed portions 78a, 78b of the abutments 76a, 76b to better control the movements of the spring legs 84a, 84b. As such, the recessed portions 78a and 78b may be configured to have a suitable depth in the respective abutments 76a, 76b to permit such receiving and engagement of the spring legs 84a, 84b when the control arm 60 is in use.

In exemplary embodiments, the spring legs 84a and 84b are axially offset relative to each other in the direction of the pivot axis 64. To accommodate for this axial offset of the spring legs 84a, 84b, the corresponding abutments 76a, 76b (including recessed portions 78a, 78b and/or the protruding portions 80a, 80b) may be configured differently from each other. For example, as shown in the illustrated embodiment, those regions of the respective recessed portions 78a, 78b that receive the axially offset spring legs 84a, 84b also may be axially offset relative to each other. Alternatively or additionally, the respective protruding portions 80a, 80b may have different axial thicknesses, as shown, or may have respective axially facing abutment surfaces 81a, 81b that are axially offset relative to each other to accommodate for the axial offset of the spring legs 84a, 84b. Such configuration(s) of the recessed portions 78a, 78b and/or the protruding portions 80a, 80b may help to restrict axial movement of the spring legs 84a, 84b and/or prevent the legs from disengaging from the abutments 76a, 76b of the control arm 60. Also as shown, the spring legs 84a, 84b each may have a bent section 85a and 85b configured to at least partially wrap around the corresponding abutments 76a, 76b of the control arm 60. This may allow the spring legs 84a, 84b to interlockingly engage within the recessed portions 78a, 78b to further restrict upward movement of the spring 62 when the return to neutral mechanism 56 is in use.

As shown in the illustrated embodiment, the spring 62 may be interposed between the stop member 58 and the control arm 60. In exemplary embodiments, the return to neutral mechanism may further include a cylindrical support 86 that extends along the pivot axis 64 and is coaxial with the rotatable shaft 64. The cylindrical support 86 may be configured to extend through the coil portion 82 of the spring to support and/or restrict vertical (upward/downward), lateral (horizontal left/right), and/or twisting movement of the spring 62. In the illustrated embodiment, the cylindrical support 86 is integral and unitary with the control arm 60; however, in other embodiments the cylindrical support 86 may be separate from the control arm 60. The control arm 60 may further include two or more tabs 87 extending in the direction of the pivot axis 64 from the main body portion of the control arm 60, which may be configured to at least partially encompass the coil portion 82 of the spring 62 to restrict transverse movement. In exemplary embodiments, the tabs 87 are on opposite upper and lower sides of the coil portion 82, and may be configured to cooperate with elements of the stop member 58 to encompass and contain the spring 62. Such feature(s) of the cylindrical support 86 and/or tabs 87, in cooperation with the control arm abutments 76a, 76b, also may facilitate assembly of the return to neutral mechanism 56 by allowing the spring 62 to be carried by the control arm 60.

The stop member 58 includes a first spring stop 88a configured to restrict outward movement of the first spring leg 84a, and a second spring stop 88b configured to restrict outward movement of second spring leg 84b. In exemplary embodiments, the stop member 58 is configured as a bracket and the spring stops 88a, 88b are each configured as laterally spaced apart abutments, such as tabs, extending in the pivot axis direction from a main body portion 89 of the stop member 58. As shown, the laterally spaced apart spring stops 88a and 88b may define a gap for allowing the spring 62 to be received by the stop member 58 in the direction of the pivot axis, which may facilitate assembly of the return to neutral mechanism 56.

In exemplary embodiments, the stop member 58 has at least one opening 90 for receiving a fastener 92 configured to fixedly mount the stop member 58 to the housing 24. More particularly, the at least one opening 90 may be configured to permit adjustment of the stop member 58 along at least two directions transverse to the direction of the pivot axis 64 (such as vertical, lateral, and/or radial directions) to preload the spring 62 via the spring legs 84a, 84b with the spring stops 88a, 88b at the neutral position prior to the stop member 58 being fixedly mounted to the housing 24.

In exemplary embodiments, the opening 90 (e.g., a hole, slot, aperture, or the like) may be sized to be greater than the portion of the fastener 92 (e.g., a bolt, screw, pin or other suitable fastener) extending through the opening 90 to provide sufficient spacing that allows such multi-directional adjustment of the stop member 58 along the at least two transverse directions (e.g., upwards/downwards, side-to-side, and/or radially about the pivot axis 64). For example, the lateral size of the opening 90 may be sized to be in the range from 1.5 to 4 times the diameter of the portion of the fastener extending through the opening, and the vertical size of the opening 90 may be sized to be in the range from 1.5 to 4 times the diameter of the portion of the fastener. In exemplary embodiments, the lateral size of the opening may be greater than the vertical size of the opening to allow greater lateral adjustment to preload at the neutral position.

The spring legs 84a, 84b also may be configured to diverge outwardly at an angle from the coil portion 82 as shown, such that vertical movement of the stop member 58 (e.g., upward/downward) relative to the pivot axis 64 may further enable such adjustment to provide the desired preloading of the spring 62 via the spring stops 88a, 88b urging the spring legs 84a, 84b. As shown, the opening 90 may be disposed at position radially outward from a portion of the control arm 60 (e.g., between the laterally spaced apart legs 74a, 74b) to allow the fastener 92 to be addressable during adjustment and mounting of the stop member 58. Also as shown, the stop member 58 may further have a second opening 94 that is configured to receive the cylindrical support 86. In this manner, the second opening 94 may be coaxial with the rotatable shaft 46 and also may be configured to permit adjustment of the stop member 58 along the at least two transverse directions prior to fixedly mounting the stop member 58 to the housing 24.

Such configuration(s) of the opening(s) (e.g., 90, 92) in the stop member 58 that allow such multi-directional adjustment of the stop member 58 to preload the spring 62 at the neutral position during assembly may facilitate the assembly process, may improve manufacturing and cost by allowing for increased tolerances of the component(s), and may further enhance the operation of the return to neutral mechanism 56 by reducing lag between the components when the mechanism 56 is being used by the operator. For example, it is generally understood the return to neutral mechanism 56 may be configured to automatically return the control arm 60 to the neutral position after the control arm 60 has been moved toward the first or second positions and then released by the operator. In the exemplary embodiment, the stop member 58 may be adjusted along the various transverse directions during the assembly process such that the stop member 58 preloads the spring 62 in such a way that each spring leg 84a, 84b is always interfacing with either the corresponding spring stop 88a, 88b, the corresponding control arm abutment 76a, 76b, or both the corresponding spring stop and the corresponding control arm abutment (as discussed in further detail below with reference to FIGS. 9-11. By providing such adjustment capabilities to preload the spring 62 in this way therefore reduces operational lag during rotation of the control arm 60 because each spring leg 84a, 84b always may be engaged to permit movement relative to each other when the control arm 60 is rotated from the neutral position toward the first or second positions.

Such multi-directional adjustment capabilities of the stop member 58 also may provide for more flexibility in component manufacturing tolerances. This may allow certain components, such as the control arm 60 and/or stop member 58, to be made from powder metallurgy techniques, which may provide a cost advantage compared to fabricated and machined parts. The use of powder metallurgy also may enable one or more features (e.g., abutments 76, recesses 78, protrusions 80, tabs 87, support 86, stops 88, etc.) to be formed in the control arm 60 and/or stop member 58 to better control movement of the spring 62 and restrict twisting, while also better encompassing the spring 62 to prevent disengagement.

Figure 9:
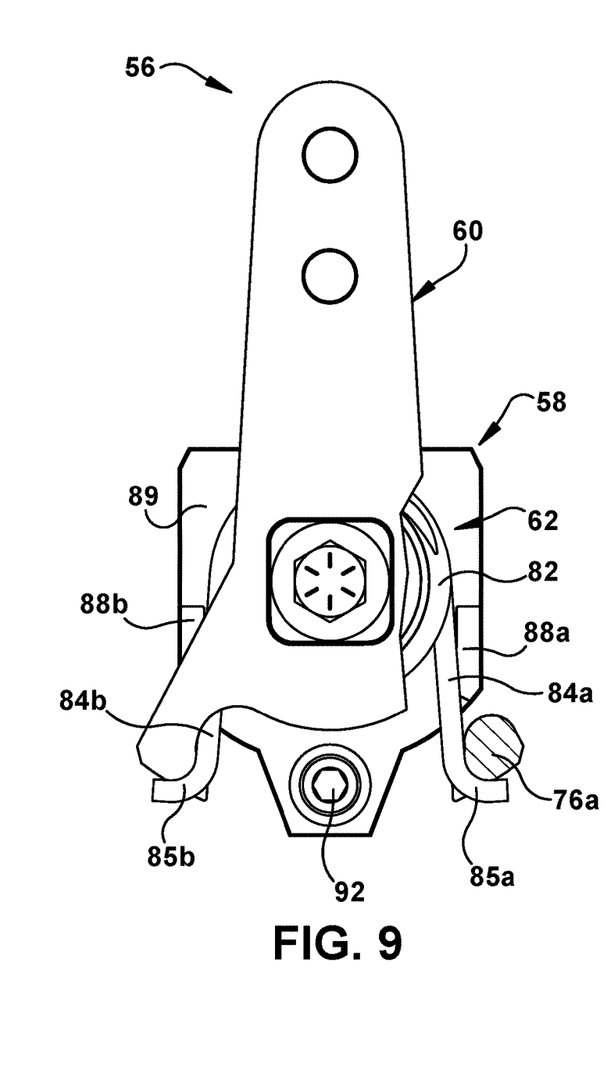
FIG. 9 is a front plan view of the return to neutral mechanism in FIG. 2, shown in an exemplary neutral position, with the exemplary control arm shown in partially cutaway view.
Figure 10:
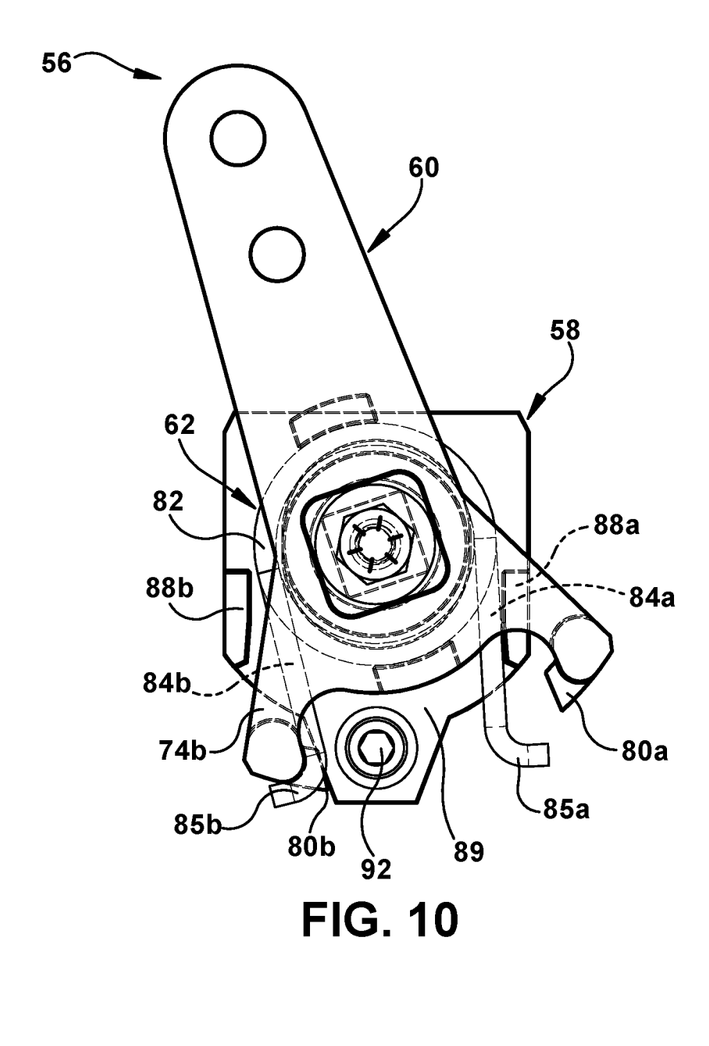
FIG. 10 is a front plan view of the return to neutral mechanism in FIG. 9, shown in an exemplary reverse position, with the control arm shown in phantom view.
Figure 11:
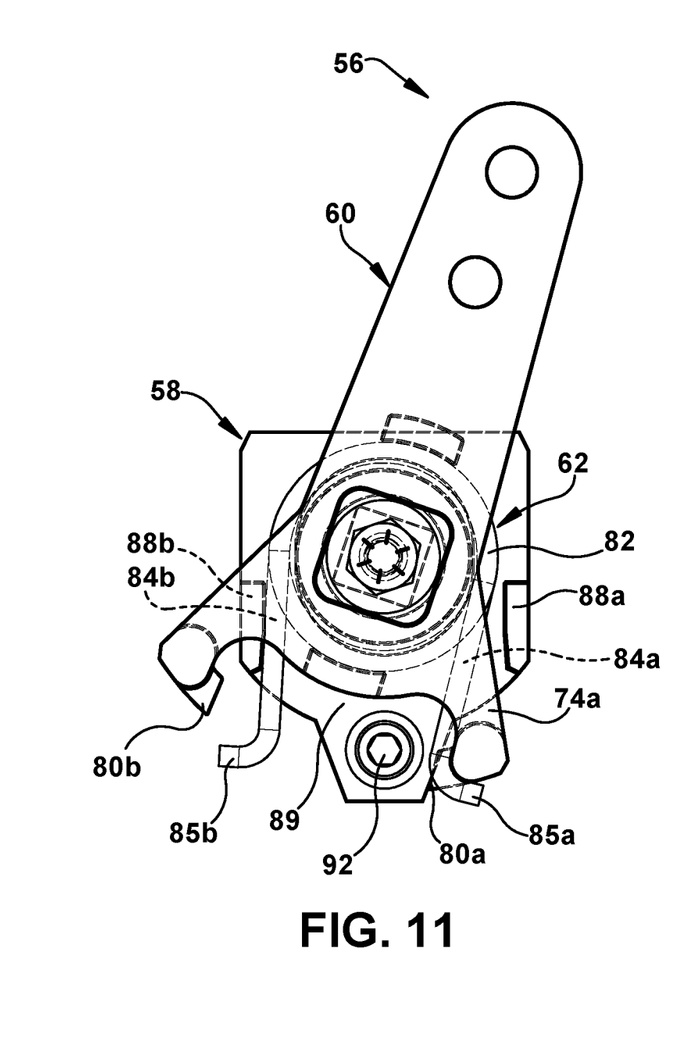
FIG. 11 is a partially cutaway front plan view of the return to neutral mechanism in FIG. 9, shown in an exemplary forward position, with the control arm shown in phantom view.

Referring particularly to FIGS. 9-11, the operation of the return to neutral assembly 56 will be described in further detail. As discussed above, in the illustrated embodiment the stop member 58 may be adjusted along at least two transverse directions during assembly (e.g., vertically and laterally) such that the first spring stop 88a and the second spring stop 88b respectively engage the first spring leg 84a and the second spring leg 84b to preload the spring 62 at the neutral position. After the stop member 58 has been fixedly mounted to the housing 24 with the fastener 92, and when the hydrostatic transmission is in use, the control arm 60 is normally biased to the neutral position to prevent propulsion of the vehicle.

When the control arm is at the neutral position (shown in FIG. 9, for example), both the first spring stop 88a and the first abutment 76a may engage the first spring leg 84a, and both the second spring stop 88b and the second abutment 76b may engage the second spring leg.

When the control arm 60 is rotated by the operator (such as via handles 19) toward the first position from the neutral position (shown in FIG. 11, for example), the second spring stop 88b restricts outward movement of the second spring leg 84b relative to the first spring leg 84a, and the first abutment 76a of the control arm 60 urges the first spring leg 84a toward the second spring leg 84b against the biasing force of the spring 62. As shown, the protruding portion 80a of the first abutment 76a of the control arm 60 may have an angle that mates with a corresponding angle of a lower portion of the main body portion 89 of the stop member 58 to provide a stop for restricting over-rotation of the control arm 60 toward the first position. It is understood that this external stop is merely exemplary, and other stop mechanisms, which may be either internal and/or external to the pump housing, may be provided for restricting over-rotation of the control member. When the control arm 60 is released from the first position (such as via releasing the handles 19), the biasing force of the spring 62 urges the control arm 60 back to the neutral position.

When the control arm 60 is rotated by the operator (such as via handles 19) toward the second position from the neutral position (shown in FIG. 10, for example), the first spring stop 88a restricts outward movement of the first spring leg 84a relative to the second spring leg 84b, and the second abutment 76b of the control arm 60 urges the second spring leg 84b toward the first spring leg against the biasing force of the spring 62. As shown, the protruding portion 80b of the second abutment 76b of the control arm 60 may have an angle that mates with a corresponding angle of a lower portion of the main body portion 89 of the stop member 58 to provide a stop for restricting over-rotation of the control arm 60 toward the second position. As noted above, other stop mechanisms, which may be either internal and/or external to the housing, may be provided for restricting such over-rotation of the control member. When the control arm 60 is released from the second position (such as via releasing the handles 19), the biasing force of the spring 62 urges the control arm 60 back to the neutral position.

It is understood that the return to neutral mechanism 56 described above generally maintains the pump 26 in its neutral position until the control arm 60 is moved toward a forward or reverse position, and returns the pump 26 to neutral after the control arm 60 has been moved to at least one of the forward or reverse positions. In some exemplary embodiments, however, it can be desirable to have the return to neutral mechanism 56 return the pump 26 to neutral from only one of the operating directions. For example, in some exemplary applications it may be desirable to only return the pump 26 to neutral when the pump is operated in the reverse direction. To achieve such unidirectional return to neutral functionality, one of the control arm abutments 76a or 76b can be removed or reduced in length such that it does not engage a respective leg 84a or 84b of the spring 62 when the control arm 60 is rotated. In this manner, the control arm 60 may be able to freely rotate independent of the spring 62 in one direction, while when rotated in the other direction the remaining abutment engages the respective leg of the spring and functions to return the pump 26 to neutral as described above. As an alternative to removing or reducing in length one of the control arm abutments, one of the abutments 76a or 76b may include a slot or notch having sufficient depth into which the corresponding spring leg 84a or 84b can extend without urging the spring leg when the control arm 60 is rotated to thereby prevent loading of the spring 62.

According to an aspect of the present disclosure a hydrostatic transmission is provided, including: a hydraulic motor having an output shaft for driving at least one wheel of the vehicle; a hydraulic pump in fluid communication with the hydraulic motor, the hydraulic pump having a movable control member for controlling the output of the pump; a housing containing at least the hydraulic pump; a rotatable shaft operatively coupled to the movable control member and having at least a portion extending from the housing; and a return to neutral mechanism operatively coupled to the rotatable shaft, the return to neutral mechanism comprising: a stop member mounted to the housing; a control arm operatively coupled to the portion of the rotatable shaft extending from the housing, the control arm being rotatable about a pivot axis between a first position, in which the control arm moves the rotatable shaft and thereby the control member toward a forward position for effecting pump output flow that enables the vehicle to propel forward, and a second position, in which the control arm moves the rotatable shaft and thereby the control member toward a reverse position for effecting pump output flow that enables the vehicle to propel in reverse; and a spring for engaging the control arm and the stop member, the spring configured to bias the control arm to a neutral position, between the first position and the second position, in which the control arm moves the rotatable shaft and thereby the control member to a position in which the vehicle is in neutral; wherein the stop member has at least one opening for receiving a fastener to fixedly mount the stop member to the housing, the at least one opening configured to permit adjustment of the stop member along at least two directions transverse to the direction of the pivot axis, to preload the spring with the stop member at the neutral position prior to the stop member being fixedly mounted to the housing, such that the return to neutral mechanism is configured to automatically return the control arm to the neutral position after the control arm has been moved toward the first or second positions.

Embodiments according to the present disclosure may include one or more of the following additional features separately or in combination.

For example, the fastener may have at least a portion that extends in the direction of the pivot axis through the at least one opening in the stop member, and the at least one opening may be configured to permit adjustment of the stop member along the at least two directions transverse to the pivot axis by providing spacing between the surfaces defining the opening and the portion of the fastener extending through the opening, including lateral or radial spacing in a first transverse direction and vertical spacing in a second transverse direction perpendicular to the first transverse direction.

The spring may have a first spring leg and a second spring leg; and the control arm may have a first abutment having a first recessed portion for receiving the first spring leg, the first abutment being configured to engage and urge the first spring leg toward the second spring leg against the biasing force of the spring when the control arm is rotated toward the first position.

The control arm may have a second abutment having a second recessed portion for receiving the second spring leg, the second abutment being configured to engage and urge the second spring leg toward the first spring leg against the biasing force of the spring when the control arm is rotated toward the second position.

The control arm may have a first control arm leg and a second control arm leg laterally spaced apart from the first control arm leg.

The first abutment may extend from the first control arm leg in the direction of the pivot axis, the first abutment having a first protruding portion extending transverse to the pivot axis direction, the first protruding portion being spaced apart from the first control arm leg in the pivot axis direction to define at least a portion of the first recessed portion.

The second abutment may extend from the second control arm leg in the direction of the pivot axis, the second abutment having a second protruding portion extending transverse to the pivot axis direction, the second protruding portion being spaced apart from the second control arm leg in the pivot axis direction to define at least a portion of the second recessed portion.

The first and second spring legs may be laterally spaced apart and axially offset relative to each other in the direction of the pivot axis.

The first recessed portion and the second recessed portion that receive the corresponding first and second spring legs may be axially offset relative to each other for accommodating the axial offset of the first and second spring legs.

The first spring leg may have a first bent section configured to at least partially wrap around the first abutment of the control arm.

The second spring leg may have a second bent section configured to at least partially wrap around the second abutment of the control arm.

The stop member may have a first spring stop, such as a first abutment stop, configured to restrict outward movement of the first spring leg, and a second spring stop, such as a second abutment stop, configured to restrict outward movement of second spring leg.

The at least one opening in the stop member that receives the fastener may be configured to permit adjustment of the stop member prior to the stop member being fixedly mounted to the housing, such that the first spring stop and the second spring stop respectively engage the first spring leg and the second spring leg to preload the spring at the neutral position.

After the stop member has been fixedly mounted to the housing with the fastener, the first spring leg may always be in engagement with either: (i) a first abutment of the control arm, (ii) the first spring stop of the stop member, or (iii) both the first abutment and the first spring stop; and the second spring leg is always in engagement with either: (i) a second abutment of the control arm, (ii) the second spring stop of the stop member, or (iii) both the second abutment and the second spring stop; thereby reducing operational lag during the rotation of the control arm.

When the control arm is at the neutral position, both the first spring stop and the first abutment of the control arm may engage the first spring leg, and both the second spring stop and the second abutment of the control arm may engage the second spring leg.

When the control arm is rotated toward the first position from the neutral position, the first abutment of the control arm may urge the first spring leg toward the second spring leg against the biasing force of the spring, and the second spring stop may restrict outward movement of the second spring leg relative to the first spring leg.

When the control arm is rotated toward the second position from the neutral position, the second abutment of the control arm may urge the second spring leg toward the first spring leg against the biasing force of the spring, and the first spring stop may restrict outward movement of the first spring leg relative to the second spring leg.

The first and second spring stop may each be configured as laterally spaced apart abutments extending from a body portion of the stop member in the direction of the pivot axis.

The laterally spaced apart abutment stops may define a gap therebetween for allowing the spring to be received by the stop member in the direction of the pivot axis.

The control arm may be arranged opposite the stop member, the spring being a torsion spring having a coil portion interposed between the stop member and control arm.

The return to neutral mechanism may further include a cylindrical support extending along the pivot axis and supporting the coil portion of the spring coaxially with the rotatable shaft.

The stop member may have a second opening configured to receive the cylindrical support, the second opening configured to permit adjustment of the stop member along the at least two directions transverse to the direction of the pivot axis prior to the stop member being fixedly mounted to the housing.

The control arm may further include at least two tabs extending in the direction of the pivot axis, the at least two tabs configured to at least partially encompass the spring to restrict movement of the spring in directions transverse to the pivot axis direction.

The control arm may have an elongated upper portion configured to be operatively coupled to a handle for manipulation by a user for moving the control arm between the first and second positions.

According to another aspect of the present disclosure, a hydrostatic transmission is provided, including: a hydraulic motor having an output shaft for driving at least one wheel of the vehicle; a hydraulic pump in fluid communication with the hydraulic motor, the hydraulic pump having a movable control member for controlling the output of the pump; a housing containing at least the hydraulic pump; a rotatable shaft operatively coupled to the movable control member and having at least a portion extending from the housing; and a return to neutral mechanism operatively coupled to the rotatable shaft, the return to neutral mechanism comprising: a stop member mounted to the housing; a control arm operatively coupled to the portion of the rotatable shaft extending from the housing, the control arm being rotatable about a pivot axis between a first position, in which the control arm moves the rotatable shaft and thereby the control member toward a forward position for effecting pump output flow that enables the vehicle to propel forward, and a second position, in which the control arm moves the rotatable shaft and thereby the control member toward a reverse position for effecting pump output flow that enables the vehicle to propel in reverse; and a spring for engaging the control arm and the stop member, the spring having a first spring leg and a second spring leg and being configured to bias the control arm to a neutral position, between the first position and the second position, in which the control arm moves the rotatable shaft and thereby the control member to a position in which the vehicle is in neutral; wherein the control arm has a first abutment having a first recessed portion for receiving the first spring leg, the first abutment being configured to engage and urge the first spring leg toward the second spring leg against the biasing force of the spring when the control arm is rotated toward the first position; and wherein the control arm has a second abutment having a second recessed portion for receiving the second spring leg, the second abutment being configured to engage and urge the second spring leg toward the first spring leg against the biasing force of the spring when the control arm is rotated toward the second position.

Embodiments according to the present disclosure may include one or more of the following additional features separately or in combination.

For example, the first abutment may extend away from a main body portion of the control arm leg in the direction of the pivot axis, the first abutment having a first protruding portion extending transverse to the pivot axis direction, the first protruding portion being spaced apart from the main body portion in the pivot axis direction to define at least a portion of the first recessed portion.

The second abutment may be laterally spaced apart from the first abutment and extends away from the main body portion in the direction of the pivot axis, the second abutment having a second protruding portion extending transverse to the pivot axis direction, the second protruding portion being spaced apart from the main body portion in the pivot axis direction to define at least a portion of the second recessed portion.

The first and second spring legs may be axially offset relative to each other in the direction of the pivot axis.

The first protruding portion may have an axially facing abutment surface that restricts axial movement of the first spring leg, and the second protruding portion has an axially facing abutment surface that restricts axial movement of the second spring leg.

The axially facing abutment surface of the first protruding portion may be offset in the pivot axis direction relative to the axially facing abutment surface of the second protruding portion to accommodate for the axial offset of the first and second spring legs.

The first spring leg may have a bent section configured to interlockingly engage with the first recessed portion of the control arm.

The second spring leg may have a bent section configured to interlockingly engage with the second recessed portion of the control arm.

According to another aspect of the present disclosure, a return to neutral mechanism is provided for a hydrostatic transmission that includes a housing containing a pump and a rotatable shaft extending outside of the housing for controlling the output of the pump, the return to neutral mechanism including: a stop member mountable to the housing; a control arm operatively couplable to the rotatable shaft extending outside of the housing, the control arm being rotatable about a pivot axis between a first position and a second position to move the rotatable shaft between forward and reverse positions, respectively; and a spring for engaging the control arm and the stop member, the spring being configured to bias the control arm to a neutral position, between the first position and the second position, to move the rotatable shaft to a neutral position; wherein the stop member has at least one opening for receiving a fastener to fixedly mount the stop member to the housing, the at least one opening being sized relative to the portion of the fastener extending through the opening to provide sufficient spacing that allows adjustment of the stop member along at least two directions transverse to the direction of the pivot axis.

According to another aspect of the present disclosure, a return to neutral mechanism is provided for a hydrostatic transmission that includes a housing containing a pump and a rotatable shaft extending outside of the housing for controlling the output of the pump, the return to neutral mechanism including: a stop member mountable to the housing; a control arm operatively couplable to the rotatable shaft extending outside of the housing, the control arm being rotatable about a pivot axis between a first position and a second position to move the rotatable shaft between forward and reverse positions, respectively; and a spring for engaging the control arm and the stop member, the spring being configured to bias the control arm to a neutral position, between the first position and the second position, to move the rotatable shaft to a neutral position; wherein the control arm has a first abutment having a first recessed portion for receiving the first spring leg, the first abutment being configured to engage and urge the first spring leg toward the second spring leg against the biasing force of the spring when the control arm is rotated toward the first position; and wherein the control arm has a second abutment having a second recessed portion for receiving the second spring leg, the second abutment being configured to engage and urge the second spring leg toward the first spring leg against the biasing force of the spring when the control arm is rotated toward the second position.

According to another aspect of the present disclosure, a return to neutral mechanism is provided for a hydraulic drive apparatus including a housing having a hydraulic pump mounted therein and a trunnion arm extending outside the housing and being rotatable for controlling the output of the pump, the return to neutral mechanism including: a stop member mountable to the housing and having a first stop abutment and a second stop abutment; a control arm connectable to the trunnion arm and movable between forward and reverse positions to move the trunnion arm between forward and reverse positions, respectively; and a torsion spring operatively coupled to the stop member and the control arm for biasing and returning the control arm to a neutral position after the control arm has been moved to at least one of the forward or reverse positions; wherein the first and second stop abutments of the return member each engage the torsion spring at a point radially inward from a point where the control arm engages the torsion spring, with respect to the trunnion arm.

For example, the first and second stop abutments of the stop member may engage respective spring legs of the torsion spring at respective points that are radially inward of at least one point where at least one abutment of the control arm engages at least one of the spring legs, with respect to the rotation axis of the trunnion arm.

According to another aspect of the present disclosure, a vehicle, such as a mowing machine, includes the hydrostatic transmission according to one or more of foregoing features, or the return to neutral mechanism according to one or more of the foregoing features.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference. Moreover, as used herein an "operative connection," or a connection by which entities are "operatively connected," is one in which the entities are connected in such a way that the entities may perform as intended. An operative connection may be a direct connection or an indirect connection in which an intermediate entity or entities cooperate or otherwise are part of the connection or are in between the operably connected entities.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydrostatic transmission for a vehicle, comprising:
a hydraulic motor having an output shaft for driving at least one wheel of the vehicle;
a hydraulic pump in fluid communication with the hydraulic motor, the hydraulic pump having a movable control member for controlling the output of the pump;
a housing containing at least the hydraulic pump;
a rotatable shaft operatively coupled to the movable control member and having at least a portion extending from the housing; and
a return to neutral mechanism operatively coupled to the rotatable shaft, the return to neutral mechanism comprising:
a stop member mounted to the housing;
a control arm operatively coupled to the portion of the rotatable shaft extending from the housing, the control arm being rotatable about a pivot axis between a first position, in which the control arm moves the rotatable shaft and thereby the control member toward a forward position for effecting pump output flow that enables the vehicle to propel forward, and a second position, in which the control arm moves the rotatable shaft and thereby the control member toward a reverse position for effecting pump output flow that enables the vehicle to propel in reverse; and
a spring for engaging the control arm and the stop member, the spring configured to bias the control arm to a neutral position when the control arm is in the first position, and is configured to bias the control arm to the neutral position when the control arm is in the second position, such that the control arm moves the rotatable shaft and thereby the control member to a position in which the vehicle is in neutral;
wherein the stop member has at least one opening for receiving a fastener to fixedly mount the stop member to the housing, the at least one opening configured to permit adjustment of the stop member along at least two directions transverse to the direction of the pivot axis, to preload the spring with the stop member at the neutral position prior to the stop member being fixedly mounted to the housing, such that the return to neutral mechanism is configured to automatically return the control arm to the neutral position after the control arm has been moved toward the first or second positions.

2. A hydrostatic transmission for a vehicle, comprising:
a hydraulic motor having an output shaft for driving at least one wheel of the vehicle;
a hydraulic pump in fluid communication with the hydraulic motor, the hydraulic pump having a movable control member for controlling the output of the pump;
a housing containing at least the hydraulic pump;
a rotatable shaft operatively coupled to the movable control member and having at least a portion extending from the housing; and
a return to neutral mechanism operatively coupled to the rotatable shaft, the return to neutral mechanism comprising:
a stop member mounted to the housing;
a control arm operatively coupled to the portion of the rotatable shaft extending from the housing, the control arm being rotatable about a pivot axis between a first position, in which the control arm moves the rotatable shaft and thereby the control member toward a forward position for effecting pump output flow that enables the vehicle to propel forward, and a second position, in which the control arm moves the rotatable shaft and thereby the control member toward a reverse position for effecting pump output flow that enables the vehicle to propel in reverse; and a spring for engaging the control arm and the stop member, the spring configured to bias the control arm to a neutral position, between the first position and the second position, in which the control arm moves the rotatable shaft and thereby the control member to a position in which the vehicle is in neutral;

wherein the stop member has at least one opening for receiving a fastener to fixedly mount the stop member to the housing, the at least on opening configured to permit adjustment of the stop member along at least two directions transverse to the direction of the pivot axis, to preload the spring with the slop member at the neutral position prior to the stop member being fixedly mounted to the housing, such that the return to neutral mechanism is configured to automatically return the control arm to the neutral position after the control arm has been moved toward the first or second positions; and wherein the fastener has at least a portion that extends in the direction of the pivot axis through the at least one opening in the stop member, and the at least one opening is configured to permit adjustment of the stop member along the at least two directions transverse to the pivot axis by providing spacing between the surfaces defining the opening and the portion of the fastener extending through the opening, including lateral or radial spacing in a first transverse direction and vertical spacing in a second transverse direction perpendicular to the first transverse direction.

3. The hydrostatic transmission according to claim 1,
wherein the spring has a first spring leg and a second spring leg; and
wherein the control arm has a first abutment having a first recessed portion for receiving the first spring leg, the first abutment being configured to engage and urge the first spring leg toward the second spring leg against the biasing force of the spring when the control arm is rotated toward the first position; and
wherein the control arm has a second abutment having a second recessed portion for receiving the second spring leg, the second abutment being configured to engage and urge the second spring leg toward the first spring leg against the biasing force of the spring when the control arm is rotated toward the second position.

4. The hydrostatic transmission according to claim 3,
wherein the control arm has a first control arm leg and a second control arm leg laterally spaced apart from the first control arm leg;
wherein the first abutment extends from the first control arm leg in the direction of the pivot axis, the first abutment having a first protruding portion extending transverse to the pivot axis direction, the first protruding portion being spaced apart from the first control arm leg in the pivot axis direction to define at least a portion of the first recessed portion; and
wherein the second abutment extends from the second control arm leg in the direction of the pivot axis, the second abutment having a second protruding portion extending transverse to the pivot axis direction, the second protruding portion being spaced apart from the second control arm leg in the pivot axis direction to define at least a portion of the second recessed portion.

5. The hydrostatic transmission according to claim 4,
wherein the first and second spring legs are laterally spaced apart and axially offset relative to each other in the direction of the pivot axis; and
wherein the first recessed portion and the second recessed portion that receive the corresponding first and second spring legs are axially offset relative to each other for accommodating the axial offset of the first and second spring legs.

6. The hydrostatic transmission according to claim 3,
wherein the first spring leg has a first bent section configured to at least partially wrap around the first abutment of the control arm; and
wherein the second spring leg has a second bent section configured to at least partially wrap around the second abutment of the control arm.

7. The hydrostatic transmission according to claim 1,
wherein the spring has a first spring leg and a second spring leg; and
wherein the stop member has a first spring stop configured to restrict outward movement of the first spring leg, and a second spring stop configured to restrict outward movement of second spring leg.

8. The hydrostatic transmission according to claim 7,
wherein the at least one opening in the stop member that receives the fastener is configured to permit adjustment of the stop member prior to the stop member being fixedly mounted to the housing, such that the first spring stop and the second spring stop respectively engage the first spring leg and the second spring leg to preload the spring at the neutral position, and
after the stop member has been fixedly mounted to the housing with the fastener, the first spring leg is always in engagement with either: (i) a first abutment of the control arm, (ii) the first spring stop of the stop member, or (iii) both the first abutment and the first spring stop; and the second spring leg is always in engagement with either: (i) a second abutment of the control arm, (ii) the second spring stop of the stop member, or (iii) both the second abutment and the second spring stop; thereby reducing operational lag during the rotation of the control arm.

9. The hydrostatic transmission according to claim 8,
wherein:
when the control arm is at the neutral position, both the first spring stop and the first abutment of the control arm engage the first spring leg, and both the second spring stop and the second abutment of the control arm engage the second spring leg;
when the control arm is rotated toward the first position from the neutral position, the first abutment of the control arm urges the first spring leg toward the second spring leg against the biasing force of the spring, and the second spring stop restricts outward movement of the second spring leg relative to the first spring leg; and
when the control arm is rotated toward the second position from the neutral position, the second abutment of the control arm urges the second spring leg toward the first spring leg against the biasing force of the spring, and the first spring stop restricts outward movement of the first spring leg relative to the second spring leg.

10. The hydrostatic transmission according to claim 7, wherein the first and second spring stop are each configured as laterally spaced apart abutments extending from a body portion of the stop member in the direction of the pivot axis.

11. The hydrostatic transmission according to claim 10, wherein the laterally spaced apart abutments define a gap therebetween for allowing the spring to be received by the stop member in the direction of the pivot axis.

12. The hydrostatic transmission according to claim 1, wherein the control arm is arranged opposite the stop member, the spring being a torsion spring having a coil portion interposed between the stop member and control arm;
wherein the return to neutral mechanism further includes a cylindrical support extending along the pivot axis and supporting the coil portion of the spring coaxially with the rotatable shaft.

13. The hydrostatic transmission according to claim 12, wherein the stop member has a second opening configured to receive the cylindrical support, the second opening configured to permit adjustment of the stop member along the at least two directions transverse to the direction of the pivot axis prior to the stop member being fixedly mounted to the housing.

14. The hydrostatic transmission according to claim 1, wherein the control arm further includes at least two tabs extending in the direction of the pivot axis, the at least two tabs configured to at least partially encompass the spring to restrict movement of the spring in directions transverse to the pivot axis direction.

15. The hydrostatic transmission according to claim 1, wherein the control arm has an elongated upper portion configured to be operatively coupled to a handle for manipulation by a user for moving the control arm between the first and second positions.

16. A hydrostatic transmission for a vehicle, comprising:
a hydraulic motor having an output shaft for driving at least one wheel of the vehicle;
a hydraulic pump in fluid communication with the hydraulic motor, the hydraulic pump having a movable control member for controlling the output of the pump;
a housing containing at least the hydraulic pump;
a rotatable shaft operatively coupled to the movable control member and having at least a portion extending from the housing; and
a return to neutral mechanism operatively coupled to the rotatable shaft, the return to neutral mechanism comprising:
a stop member mounted to the housing;
a control arm operatively coupled to the portion of the rotatable shaft extending from the housing, the control arm being rotatable about a pivot axis between a first position, in which the control arm moves the rotatable shaft and thereby the control member toward a forward position for effecting pump output flow that enables the vehicle to propel forward, and a second position, in which the control arm moves the rotatable shaft and thereby the control member toward a reverse position for effecting pump output flow that enables the vehicle to propel in reverse; and
a spring for engaging the control arm and the stop member, the spring having a first spring leg and a second spring leg and being configured to bias the control arm to a neutral position, between the first position and the second position, in which the control arm moves the rotatable shaft and thereby the control member to a position in which the vehicle is in neutral;
wherein the control arm has a first abutment having a first recessed portion for receiving the first spring leg, the first abutment being configured to engage and urge the first spring leg toward the second spring leg against the biasing force of the spring when the control arm is rotated toward the first position; and
wherein the control arm has a second abutment having a second recessed portion for receiving the second spring leg, the second abutment being configured to engage and urge the second spring leg toward the first spring leg against the biasing force of the spring when the control arm is rotated toward the second position.

17. The hydrostatic transmission according to claim 16, wherein the first abutment extends away from a main body portion of the control arm leg in the direction of the pivot axis, the first abutment having a first protruding portion extending transverse to the pivot axis direction, the first protruding portion being spaced apart from the main body portion in the pivot axis direction to define at least a portion of the first recessed portion; and
wherein the second abutment is laterally spaced apart from the first abutment and extends away from the main body portion in the direction of the pivot axis, the second abutment having a second protruding portion extending transverse to the pivot axis direction, the second protruding portion being spaced apart from the main body portion in the pivot axis direction to define at least a portion of the second recessed portion.

18. The hydrostatic transmission according to claim 17, wherein the first and second spring legs axially offset relative to each other in the direction of the pivot axis;
wherein the first protruding portion has an axially facing abutment surface that restricts axial movement of the first spring leg, and the second protruding portion has an axially facing abutment surface that restricts axial movement of the second spring leg; and
wherein the axially facing abutment surface of the first protruding portion is offset in the pivot axis direction relative to the axially facing abutment surface of the second protruding portion to accommodate for the axial offset of the first and second spring legs.

19. The hydrostatic transmission according to claim 17, wherein the first spring leg has a bent section configured to interlockingly engage with the first recessed portion of the control arm; and
wherein the second spring leg has a bent section configured to interlockingly engage with the second recessed portion of the control arm.

20. A return to neutral mechanism for a hydraulic drive apparatus including a housing having a hydraulic pump mounted therein and a trunnion arm extending outside the housing and being rotatable for controlling the output of the pump, the return to neutral mechanism comprising:
a stop member mountable to the housing and having a first stop abutment and a second stop abutment;
a control arm connectable to the trunnion arm and movable between forward and reverse positions to move the trunnion arm between forward and reverse positions, respectively; and
a torsion spring operatively coupled to the stop member and the control arm for biasing and returning the control arm to a neutral position after the control arm has been moved to at least one of the forward or reverse positions;

wherein the first and second stop abutments of the return member each engage the torsion spring at a point radially inward from a point where the control arm engages the torsion spring, with respect to the trunnion arm.

21. A hydrostatic transmission for a vehicle, comprising:
a hydraulic motor having an output shaft for driving at least one wheel of the vehicle;
a hydraulic pump in fluid communication with the hydraulic motor, the hydraulic pump having a movable control member for controlling the output of the pump;
a housing containing at least the hydraulic pump;
a rotatable shaft operatively coupled to the movable control member and having at least a portion extending from the housing; and
a return to neutral mechanism operatively coupled to the rotatable shaft, the return to neutral mechanism comprising:
  a stop member mounted to the housing;
  a control arm operatively coupled to the portion of the rotatable shaft extending from the housing, the control arm being rotatable about a pivot axis between a first position, in which the control arm moves the rotatable shaft and thereby the control member toward a forward position for effecting pump output flow that enables the vehicle to propel forward, and a second position, in which the control arm moves the rotatable shaft and thereby the control member toward a reverse position for effecting pump output flow that enables the vehicle to propel in reverse; and
  a spring for engaging the control arm and the stop member, the spring configured to bias the control arm to a neutral position, between the first position and the second position, in which the control arm moves the rotatable shaft and thereby the control member to a position in which the vehicle is in neutral;

wherein the stop member has at least one opening for receiving a fastener to fixedly mount the stop member to the housing, the at least one opening configured to permit adjustment of the stop member along at least two directions transverse to the direction of the pivot axis, to preload the spring with the stop member at the neutral position prior to the stop member being fixedly mounted to the housing, such that the return to neutral mechanism is configured to automatically return the control arm to the neutral position after the control arm has been moved toward the first or second positions; and wherein the control arm has first and second abutments, the first abutment being configured to engage a first stop surface of the stop member when in the first position, and the second abutment being configured to engage a second stop surface of the stop member when in the second position.

* * * * *